(12) United States Patent
Wendt

(10) Patent No.: US 9,619,435 B2
(45) Date of Patent: Apr. 11, 2017

(54) METHODS AND APPARATUS FOR MODIFYING TYPOGRAPHIC ATTRIBUTES

(75) Inventor: Max A. Wendt, Madison, WI (US)

(73) Assignee: Adobe Systems Incorporated, San Jose, CA (US)

(*) Notice: Subject to any disclaimer, the term of this patent is extended or adjusted under 35 U.S.C. 154(b) by 298 days.

(21) Appl. No.: 13/223,197

(22) Filed: Aug. 31, 2011

(65) Prior Publication Data
US 2013/0127703 A1   May 23, 2013

(51) Int. Cl.
*G06F 3/0484* (2013.01)
*G06F 17/21* (2006.01)

(52) U.S. Cl.
CPC ........ *G06F 17/211* (2013.01); *G06F 3/04847* (2013.01)

(58) Field of Classification Search
CPC ...................................................... G06F 3/048
USPC .................................. 345/173–179; 715/863
See application file for complete search history.

(56) References Cited

U.S. PATENT DOCUMENTS

| | | | |
|---|---|---|---|
| 5,347,295 A * | 9/1994 | Agulnick et al. | 345/156 |
| 2002/0011990 A1* | 1/2002 | Anwar | G06F 3/1203 345/173 |
| 2006/0026536 A1* | 2/2006 | Hotelling et al. | 715/863 |
| 2009/0265670 A1* | 10/2009 | Kim et al. | 715/863 |
| 2009/0300554 A1* | 12/2009 | Kallinen | 715/863 |
| 2009/0327978 A1* | 12/2009 | Hamadene et al. | G06F 3/04883 715/863 |

* cited by examiner

*Primary Examiner* — Alexander Eisen
*Assistant Examiner* — Cory Almeida
(74) *Attorney, Agent, or Firm* — Wolfe-SBMC

(57) ABSTRACT

Methods and apparatus for various embodiments of a text adjustment tool provide direct modification of typographic attributes of displayed text by translating indications of movement across a display, received via user input, into typographic attribute modifications. The text adjustment tool allows a user an intuitive method for modifying typographic attributes of displayed text without a user needing to access any menu windows or without even knowing which typographic attribute is being modified. The intuitive nature of the text adjustment tool is reflected by the fact that at no point during a modification of a typographic attribute of targeted text does a user's eyes ever need to leave the text being modified.

20 Claims, 10 Drawing Sheets

This is a demo of the targeted adjustment tool for text, or "text TAT." $x_0$

*FIG. 3A*

This is a demo of the targeted adjustment tool for text, or "text TAT." $x_1$

*FIG. 3B*

METHODS AND APPARATUS FOR MODIFYING TYPOGRAPHIC ATTRIBUTES

BACKGROUND

Within a software application allowing a user to manipulate text, the modification of certain typographic attributes may require navigating multiple layers of menus. Once a user arrives at an appropriate typographic adjustment window, to change a typographic attribute, most software applications require a user to enter values directly into an entry field of the typographic adjustment panel window. Through such an process, a user is required to make an adjustment through a user interface element that is independent of the text being adjusted. Further, when a user has arrived at a typographic adjustment panel window for adjusting the attribute desired, a user is often unsure of the degree by which to make a change to the current settings to arrive at a desired rendering of text being modified. In other words, a user may often need to make a series of incremental and non-intuitive typographic setting adjustments in order for targeted text to ultimately look the way the user wants it to look.

SUMMARY

In one embodiment, a targeted text adjustment tool may activate a typographic attribute adjustment mode in response to detecting an input while a cursor is over a region of selected text or over a text insertion point. The selected text or the text surrounding a text insertion point may be rendered on a display, where the rendering is based on stored typographic attributes within a memory. The targeted text adjustment tool may also receive an indication of movement of a cursor across the display while the typographic attribute adjustment mode is active, where the movement may begin at an arbitrary point within the region of selected text or where the movement begins at the text insertion point. In response to receiving the indication of movement of the cursor across the display while the typographic attribute adjustment mode is active, the targeted text adjustment tool may modify one or more characters of the stored typographic attributes. The modification of typographic attributes may depend on several input factors, such as an amount of movement, movement direction, movement velocity, and even additional input such as a key press, a key press combination, or some other type of input data. The targeted text adjustment tool may then re-render text characters according to modifications to the stored typographic attributes for the text characters.

BRIEF DESCRIPTION OF THE DRAWINGS

FIG. 3A depicts an illustration of selected text before a font size increase, according to some embodiments of the text adjustment tool.

FIG. 3B depicts an illustration of selected text after a font size increase, according to some embodiments of the text adjustment tool.

Figure 1:
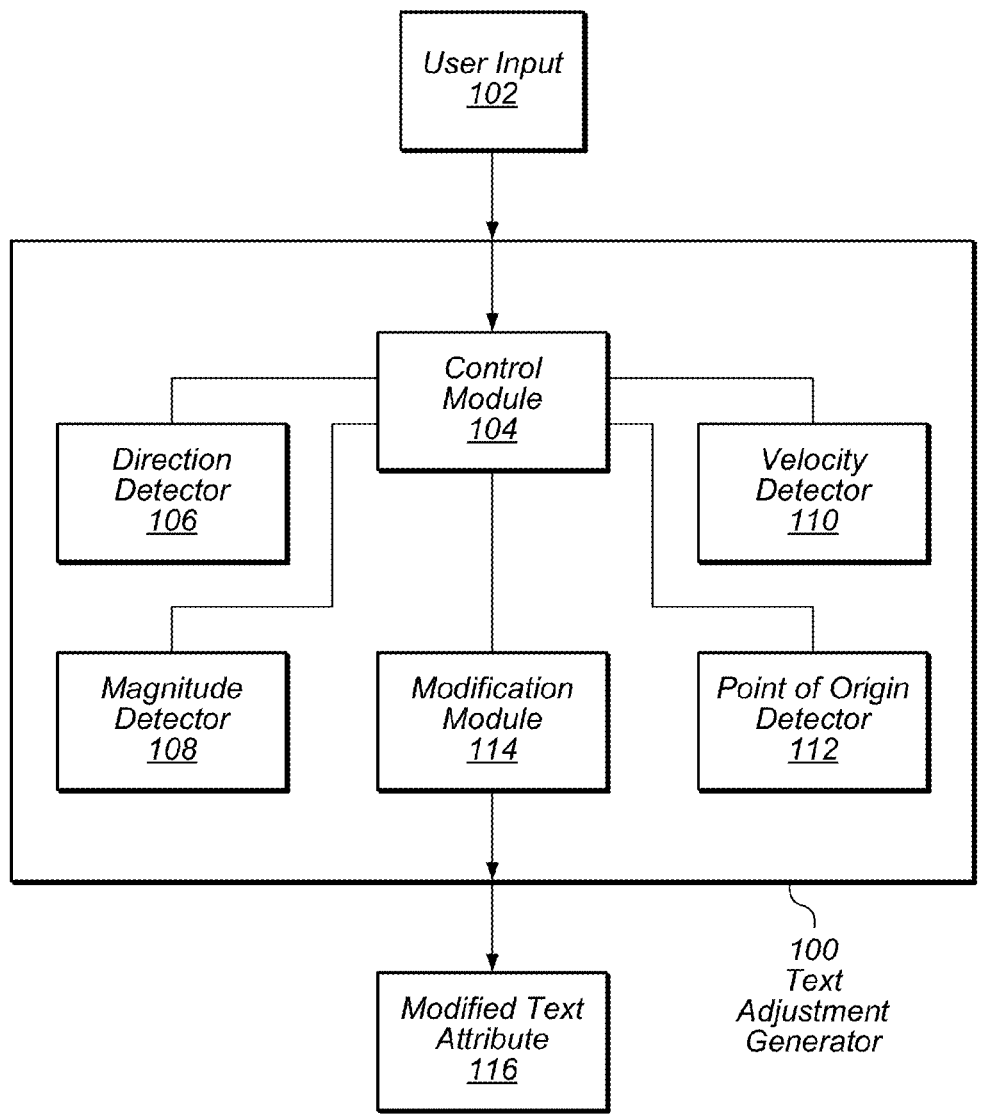
FIG. 1 illustrates a module that may implement a text adjustment tool, according to some embodiments of the text adjustment tool.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments of a text adjustment tool provide direct modification of typographic attributes of displayed text by translating indications of movement across a display into typographic attribute modifications. In some embodiments, the text adjustment tool may be included as a plugin within third party software, may be built into any document editing application, may be incorporated into mobile operating systems, or may be incorporated within applications for mobile devices. Given the applicability of the text adjustment tool to a variety of input types and computing platforms, for the sake of readability, a cursor as used throughout this application includes a traditional cursor on a display corresponding to a mouse. An equivalent cursor definition may be defined for each computing platform.

Rendered text on a display may be based on stored typographic attributes associated with the text. The text adjustment tool allows a user an intuitive method for modifying stored typographic attributes of displayed text without a user needing to access any menu windows or without even knowing which typographic attribute is being modified, in some embodiments. The intuitive nature of the text adjustment tool is reflected in some embodiments by the fact that at no point during a modification of a typographic attribute of targeted text does a user's eyes ever need to leave the text being modified. In other words, without a user ever selecting a menu option, entering typographic attribute values, or interacting with a typographic attribute adjustment panel window, a user is able to modify a typographic attribute and to immediately see the effect of a change being made as the user moves a cursor across a screen, in some embodiments. Text is re-rendered according to the modified typographic attributes. The appearance of the affected text is modified via modifications to typographic attributes and then re-rendering the text, as opposed to directly manipulating pixel data of an image or rendering of the text. In other words, it is the text attribute data (e.g., stored in a text file, word processing file, document file, etc.) that is modified.

The embodiment described above is based on a user using a traditional desktop computer with a keyboard, display, and a mouse. The mouse and keyboard serve as the input devices providing input information to be interpreted by the text adjustment tool. However, the input information received and translated by the text adjustment tool may originate from any type of input device, input method operating with any type of computing device. In other words, if a device is capable of providing input and capable of displaying and manipulating text characters, the device may support the disclosed text adjustment tool.

One embodiment of an alternate computing platform is a touch-sensitive tablet device. Many tablet devices support applications that allow a user to perform word processing functions. With tablet devices, along with many portable and handheld devices, screen space is more limited than with a desktop. Given limited screen space, it may be preferable to provide a user of any applications a method to manipulate typographic attributes without ever accessing a menu option, or opening a typographic attribute adjustment panel window. Limited screen space means that any accessed menus or windows would likely obscure the text being modified. In such cases, a better option would be for a user to be able to directly manipulate selected text with finger swipes, finger taps, or any combination of swipes and taps. For example, using a tablet device with a text adjustment tool built into an application, a user may be able to select a word with a double finger tap over the word, and once the word is indicated as selected, a user may, in one move, tap in the selected area and move a finger upward to increase a text font size. Many other typographic attribute adjustments are possible with the text adjustment tool and they are described below.

Further with respect to tablet device, while the text adjustment tool may be incorporated into an installed application on the tablet, the text adjustment tool may also be incorporated into the tablet operating system. For example, tablet devices natively support many functions such as Short Message Service (SMS) text messaging, Multimedia Messaging Service (MMS), and e-mail. Within each of these natively supported functions, text characters are often selectable, however, most current tablet operating systems only allow a user to cut, copy, or paste selected text. By incorporating the text adjustment tool into a tablet operating system, once text is selected, a user may now have options for manipulating the typographic attributes of the selected text. For example, while writing an e-mail a user may select a word with a double finger tap over the word, and once the word is selected, a user may then simultaneously tap two fingers over the selected area to italicize the selected word. The text adjustment tool may allow additional user inputs to be mapped to other common typographic attribute adjustments such as bolding and underlining. The mapping of user inputs to a given typographic attribute modification may be configurable through a user settings interface. In the case where the text adjustment tool is incorporated into an application, configuration options may be similarly available. Further, while this example is presented with respect to a tablet, the text adjustment tool can similarly be ported to any handheld device providing the proper hardware support, such as mobile phones with touch-sensitive screens.

As an example of the intuitive nature of the text adjustment tool, a user may want to change the spacing between two characters of text. However, a novice user may not know that adjusting kerning is how changing the spacing between characters is accomplished. Further, the user may not know the units by which kerning is measured or how a certain value setting would affect the displayed characters. Using the text adjustment tool, the user may simply select click within a selection area between the two text characters and begin to move a mouse in the direction and distance that produces the desired spacing between the characters. In this example, a mouse click and mouse movement were interpreted by the text adjustment tool to modify the typographic attribute of kerning. However, other indications of movement detected by other types of user input may be used as input to be interpreted by the text adjustment tool to apply modifications to targeted text.

In the following detailed description, numerous details are set forth to provide a thorough understanding of the claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment

Text Adjustment Generator

FIG. 1 illustrates an embodiment of a Text Adjustment Generator 100. Given user input 102 to interpret, the Text Adjustment Generator 100 may generate modified typographic attributes for text characters.

User input 102 may include data indicating selected text that may be any combination or quantity of text characters. User input 102 may also include data indicating text characters surrounding a region in between text characters if a mouse click is detected in a region over a text insertion point. User input 102 may also include data indicating cursor movement, cursor direction, cursor velocity, an amount of cursor movement, or a point of origin of a mouse click or finger tap. User input 102 may also include additional indications of user input such as keyboard presses, additional mouse button presses, the path of the movement, or, in the case of a touch screen, any additional finger presses on the screen.

Text Adjustment Generator 100 may include a Control Module 104 for receiving user input 102. Once Control Module 104 has collected determinations on the user input from one or more of Direction Detector 106, Magnitude Detector 108, Velocity Detector 110, and Point of Origin Detector 112, Control Module 106 may pass along user input 102 and any determination results to Modification Module 114.

Direction Detector 106 may interpret user input 102 with respect to the direction of movement of a cursor across a display. To determine upward movement of cursor input, Direction Detector 106 may calculate whether or not there is a greater amount of vertical change upward than any left or right horizontal movement. Direction Detector 106 may similarly determine downward movement. To determine rightward horizontal movement, Direction Detector 106 may calculate whether or not there is a greater amount of horizontal change to the right side of a display than any upward or downward movement. The determinations by Direction Detector 106 allow a user to provide cursor movements that are not perfectly and completely smooth in any one direction, and yet still allow for the cursor movement to be correctly interpreted. The determinations by Direction Detector 106 may be provided to Control Module 104, and may serve as the basis on which a typographic attribute modification is determined.

Magnitude Detector 108 may interpret user input 102 with respect to an amount of movement of a cursor across a display. Given that most cursor movements are not perfectly horizontal or perfectly vertical, calculating an amount of movement may include calculating the distance between two points on a grid of pixels making up a display. The determinations by Magnitude Detector 108 may be provided to Control Module 104, and may serve as the basis on which a typographic attribute modification is determined.

Velocity Detector 110 may interpret user input 102 with respect to the speed with which a cursor is moved across a display. Cursor movement speed may be used as a basis on which to determine the rate of change of a typographic attribute adjustment. The determinations by Magnitude Detector 108 may be provided to Control Module 104, and may serve as the basis on which a typographic attribute modification is determined. In some embodiments, the text adjustment tool may be implemented without using cursor speed as a factor in determining a typographic adjustment.

Point of Origin Detector 112 may interpret user input 102 to determine whether a mouse click is received while a cursor is hovering over a region between characters of selected text. A button click received while over this region between text characters is referred to as a text insertion point. The determinations by Point of Origin Detector 108 may be provided to Control Module 104, and may serve as the basis on which a typographic attribute modification is determined.

After user input 102 has been processed by one or more of Direction Detector 106, Magnitude Detector 108, Velocity Detector 110, and Point of Origin Detector 112, Control Module 104 may transmit user input 102 and determination from the modules to Modification Module 114. Modification Module 114 may then interpret the input and the various determinations in order to generate a modified text attribute, which is then output as Modified Text Attribute 116.

Each of the modules within Text Adjustment Generator 100 may be implemented by program instructions stored in a computer-readable storage medium and executable by one or more processors. Other embodiments of the modules within the text adjustment tool may be at least partially implemented by hardware circuitry or firmware within one or more processors.

Example Embodiment

Generating Modified Typographic Attributes

Figure 2:
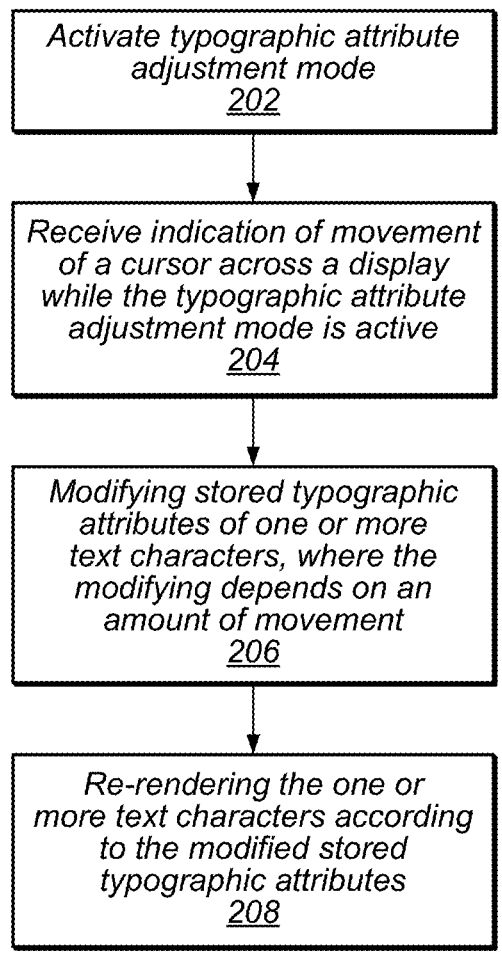
FIG. 2 is a flowchart of an embodiment of the text adjustment tool.

FIG. 2 illustrates a flowchart highlighting certain processing steps that may be present in an embodiment of the text adjustment tool. In text editing software applications, users may select one or more text characters with the intention of somehow modifying the selected text characters. A common example is for a user to double-click on a word to select it, then right click to invoke a font formatting window from which the user may select new font attributes. By incorporating the text adjustment tool into the text editor, a user may be presented with additional options when text is selected without needing to open any additional windows or directly set any values. For some text adjustment tool typographic attribute modifications, no text is required to be selected before performing a typographic attribute modification.

The text adjustment tool is context aware in that the typographic attribute adjustment mode may be activated while a cursor is within the context of selected text. In other words, within a region of selected text, in some cases indicated by highlighting the selected text, the typographic attribute adjustment mode may be activated if a button click is received while the cursor is within the region of selected text. If a button click is received while the cursor is outside the context of the selected region, the typographic attribute adjustment mode may not be activated, allowing traditional typographic actions to be carried out, such as text selection changes.

The context awareness of the text adjustment tool may be defined differently for different computing platforms. For example, on a touch-sensitive device, context awareness may be the combination of text being selected followed by a finger touch and hold, and subsequent finger movement, where the finger touch may be initiated at any point on the display. In this example, selected text provided the target of the typographic attribute adjustments even when the input indicating movement was initiated at a point not over the selected text.

The text adjustment tool is targeted in the sense that typographic attribute adjustments are applied only to selected text or to the text characters around the region of a text insertion point. The targeted attribute adjustments provide a user with intuitive modifications in the sense that a user would normally expect any changes to be applied only to text that has been selected. The selected text may be indicated either explicitly as when text is highlighted, or implicitly as when a user activates the typographic attribute adjustment mode by selecting a text insertion point while hovering a cursor over a region between characters without selecting the characters.

In some embodiments, the text adjustment tool is not modal, meaning that a user is not prevented from performing other actions or selections once the typographic attribute adjustment mode is activated. In other embodiments, the text adjustment tool may be enabled or disabled altogether, either through a user setting or by a key mapped to disable the activation of the text adjustment tool.

In some embodiments of the text adjustment tool, when a user selects particular text, the cursor icon may change to indicate that a typographic attribute adjustment mode is available. For example, in FIG. 3B, after text is selected, and while the cursor is hovering above the selected text, the cursor icon is changed from an arrow, as seen in FIG. 3A, to a textured circle with up and down arrows coming out of the top and bottom of the circle.

In other embodiments, the cursor icon may not change at all to reflect the activation or availability of the typographic attribute adjustment mode. On some platforms, such as touch devices, there may be no cursor displayed after text is selected. Once the typographic attribute adjustment mode is activated, subsequent user inputs may be interpreted to determine particular typographic attribute adjustments to be applied to the stored typographic attributes, which are accessed in order to render the text on the display.

The text adjustment tool may also perform typographic attribute adjustments without selected text. For example, when a user intends to change the space between characters, a user may hover the cursor over a region between two text characters. If the user performs a button click while over the region between characters and holds the button down, the typographic attribute adjustment mode may be activated. In some embodiments, while the user is hovering above the region between characters the cursor icon may be changed to indicate the availability of the text adjustment tool. In other embodiments, no cursor icon is changed to indicate either the availability of the text adjustment tool or the activation of the typographic attribute adjustment mode.

At this point, using a mouse to select text, and with a cursor hovering over the selected text, a user may perform a variety of input combinations which may be interpreted by the text adjustment tool. In one example, while the typographic attribute adjustment mode is active a user may click within the region of the selected text, and while the user maintains the click by holding down the mouse button, the user may begin to move the mouse upward. This upward click and drag movement results in the text adjustment tool receiving an indication of movement of a cursor across a display, as in step 204.

Upon receiving user input indicating movement of a cursor across a display while the typographic attribute adjustment mode is active, the text adjustment tool may access and then modify stored typographic attributes of one or more text characters of the selected text, where the modifying depends on an amount of movement, as in step 206.

In a text editing software application, text is rendered on a display according to stored typographic attributes for the text. When the text adjustment tool determines a typographic attribute modification, the modification is applied to the stored typographic attributes for the text. In this way, when the text is next rendered, the text is rendered according to the stored typographic attributes that have been modified, as in step 208.

In some embodiments, the text being modified is re-rendered with each update to stored typographic attributes for the text. In other embodiments, the text is re-rendered only once the typographic attribute adjustments have been completed.

The rendering of the text based on the modifications to the stored typographic attributes provides intuitive feedback to a user who simply sees typographic attributes being modified as the user moves the cursor. In this way, a user performs a typographic attribute modification without ever moving the cursor away from the text being modified, without ever navigating through menu windows, without ever manually entering typographic values in entry fields, and without manipulating sliders or controls within a window that is displayed independent of the text being modified.

Example Typographic Attribute Modification: Font Size

FIGS. 3A and 3B depict an example of the text adjustment tool applied to selected text to increase a font size of the selected text. In FIG. 3A, the word "targeted" is selected, as indicated by the gray shading surrounding the word. In FIG. 3A, the cursor icon is an arrow as it hovers over the selected text. In some embodiments, once a word is selected the cursor icon changes as the cursor hovers over the selected text to indicate availability of the text adjustment tool. In other embodiments, the cursor icon does not change until a user clicks a mouse button while over the selected text, in which case the cursor icon change indicates activation of the typographic attribute adjustment mode.

In some editing software applications, a font size may be displayed within a toolbar. In such a case, as the text adjustment tool increases the font size, the font size value is changed to match the font size as the font size is increased by the text adjustment tool. While font size is a typographic attribute that is familiar to most users, and while changing the font size can often be done without navigating many menu windows, a user may still not know whether the font size they want is 24 point or 29 point. In other words, a user may often enter a series of values in order to arrive at a desired font size. However, using the text adjustment tool, a user may receive instant visual feedback as the user enters an indication of upward movement. In this way, without knowing which font size value corresponds to a desired font size, the user is provided with an intuitive method for resizing text, and the user may stop increasing the font size when the appearance of the selected text satisfies the user.

As depicted within FIG. 3A, an initial font size of the selected word, "targeted", is indicated by $x_0$. Once the user activates the typographic attribute adjustment mode by clicking a button while the cursor is hovering over the selected text region, the direction of the mouse movement may be interpreted by the text adjustment tool. In this case, when the user moves the mouse upward while maintaining the initial button click, the font size is increased in accordance with the amount of upward movement of the mouse while the typographic attribute adjustment mode is activated.

In FIG. 3B, after upward movement of the mouse is detected while in the typographic attribute adjustment mode, the font size of the text characters of the selected text are increased in proportion to the upward movement of the mouse as measured by the distance from the initial click activating the typographic attribute adjustment mode until the mouse button is released to deactivate the typographic attribute adjustment mode. In other words, if the amount of upward movement is small, the font size is increased by a small amount, and if the amount of upward movement is large, the font size is increased by a large amount. The increase in font size is reflected in the rendering of the selected text according to new stored typographic attributes modified by the text adjustment tool, as reflected by new size $x_1$.

The font size of selected text may also be decreased by the text adjustment tool. Given the selected text in FIG. 3A, when a user activates the typographic attribute adjustment mode, a user may move the cursor downward to decrease the font size of the selected text. The process of the text adjustment tool interpreting user input, activating the typographic attribute adjustment mode, and modifying stored typographic attributes is similar to the process for increasing font size.

In some cases, selected text may include text characters with a variety of font sizes. In such a case, the text adjustment tool applies a typographic attribute modification such that each of the text characters is uniformly modified. Depending on the magnitude of cursor movement, a delta may be determined that corresponds to an amount by which to modify the particular typographic attributes. Given the determined delta, each of the text characters modified may have their typographic attribute values modified by the same delta value. This uniform application of typographic attribute adjustment is performed similarly for each of the other available typographic attribute adjustments by the text adjustment tool. For example, if the selected text is "AB", where "A" is in a 20 point font size and "B" is in a 10 point font size, after an increase in font size is determined to be 2 points, based on the magnitude of cursor movement, the font size of "A" is modified to be 22 points and the font size of "B" is modified to be 12 points.

While the above examples of increasing or decreasing font sizes are performed in response to upward or downward indications of movement while the typographic attribute adjustment mode is activated, other mappings of user input movements to typographic attribute modifications may be defined. Further, the text adjustment tool may provide a user with the ability to create their own mappings of user input to typographic attribute adjustments through a user settings interface or configuration file.

Example Typographic Attribute Modification: Tracking

Figure 4A:
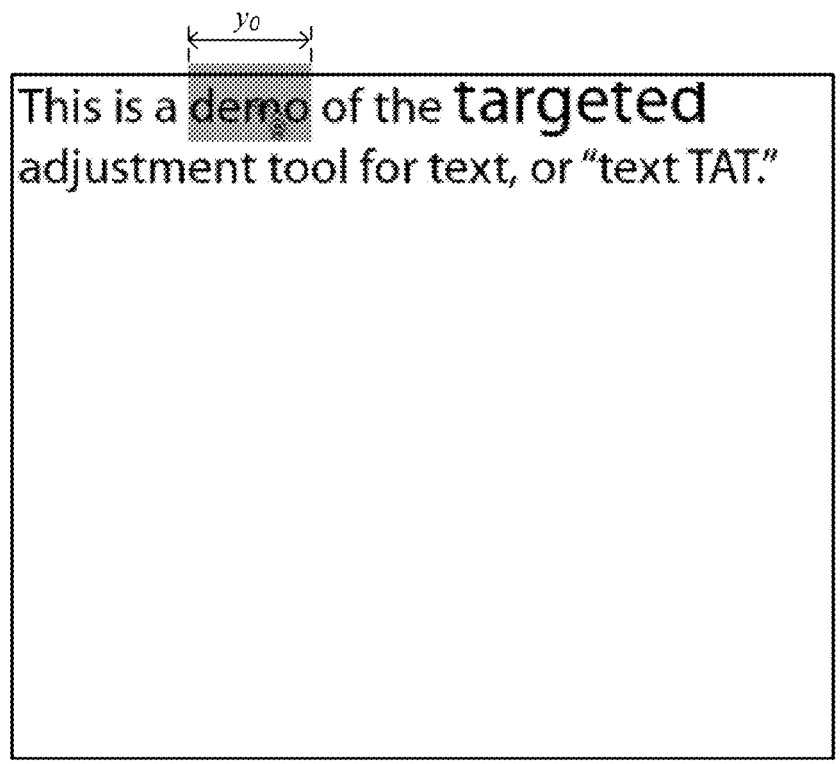
FIG. 4A depicts an illustration of selected text before a tracking value increase, according to some embodiments of the text adjustment tool.
Figure 4B:
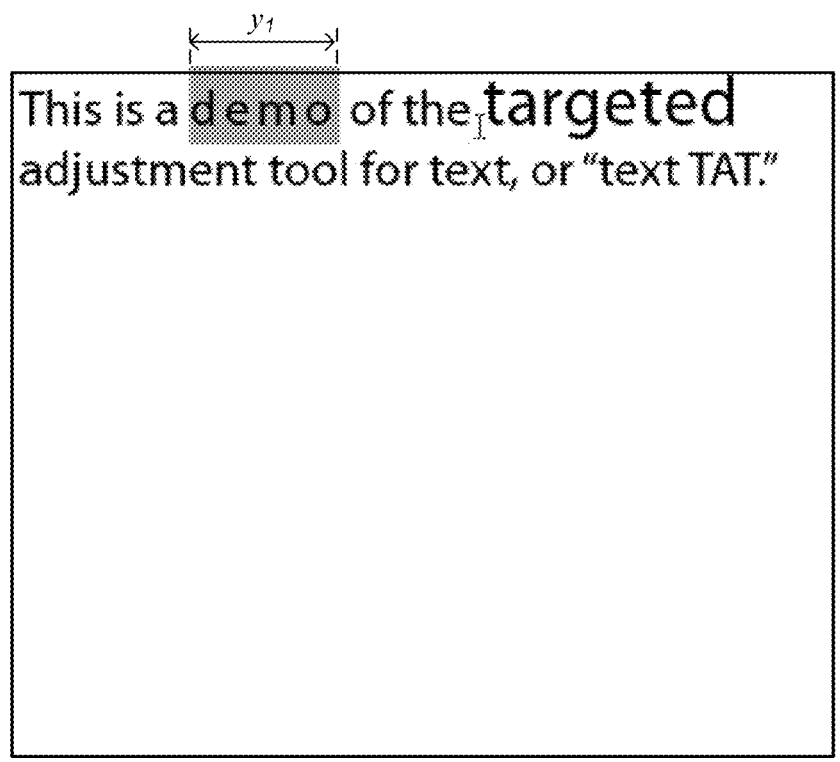
FIG. 4B depicts an illustration of selected text after a tracking value increase, according to some embodiments of the text adjustment tool.

FIGS. 4A and 4B depict an example of the text adjustment tool applied to selected text to increase the tracking values of the selected text. Tracking is the kind of typographic attribute with which many users are unfamiliar. Tracking refers to the amount of space between text characters. When tracking is increased, the space between characters is increased. A user may sometimes know that the typographic effect they are seeking is to spread the letters of a word out to fill a certain width, such as to match the width of an image, but novice users may not know that tracking values are what determine the space between text characters. The text adjustment tool provides an intuitive method for increasing tracking without a user ever needing to know which typographic attribute is being modified.

In FIG. 4A, the word "demo" is selected, as indicated by the gray shading surrounding the word. The initial width of the entire selected text is indicated by $y_0$. Once the user activates the typographic attribute adjustment mode, the direction of the mouse movement may be interpreted by the text adjustment tool. The typographic attribute adjustment mode may be activated by clicking and holding down a button at a point when the cursor was hovering over the selected text. As the user holds down the mouse button and as the user moves the cursor to the right side of the display, the tracking is increased in accordance with the amount of rightward movement for so long as the typographic attribute adjustment mode is active. When the user is satisfied with the tracking adjustment, the user may deactivate the typographic attribute adjustment mode by releasing the mouse button or pressing a key mapped to deactivate the text adjustment tool.

FIG. 4B depicts a result after a user has completed a typographic attribute adjustment, as indicated by a new width $y_1$ of the entire selected text. The new width is reflective of the new tracking values that specify the space between the characters of the text. In this example, a user may deactivate the typographic attribute adjustment mode based on the visual feedback as indicated by the rendered text characters. However, when the user has completed the typographic attribute adjustment, the user may not be aware of what the new tracking values any more than the user was aware of the initial tracking values. The user simply sees the increased spacing between the text characters.

Tracking values for selected text may also be decreased by the text adjustment tool. Given the selected text in FIG. 4A, when a user activates the typographic attribute adjustment mode, a user may move the cursor leftward to decrease the tracking values of the selected text. The process of the text adjustment tool interpreting user input, activating the typographic attribute adjustment mode, and modifying stored typographic attributes is similar to the process for increasing tracking values.

As with font sizes, tracking typographic adjustments may be applied to the stored typographic attributes such that changes to the spacing between text characters is applied uniformly. Before tracking is applied to selected text, the selected text may have various amounts of tracking values defining the space between each pair of characters. Similar to the example discussed above with respect to font sizes, after a tracking value delta is determined based on the quantity of cursor movement, or on the quantity as determined by magnitude of cursor movement coupled with velocity, the tracking value delta is applied to each affected text character. For example, after a tracking delta of 2 em units is determined, each tracking value for each affected text character is increased by 2 em units.

Example Typographic Attribute Modification: Baseline Shift

Figure 5A:
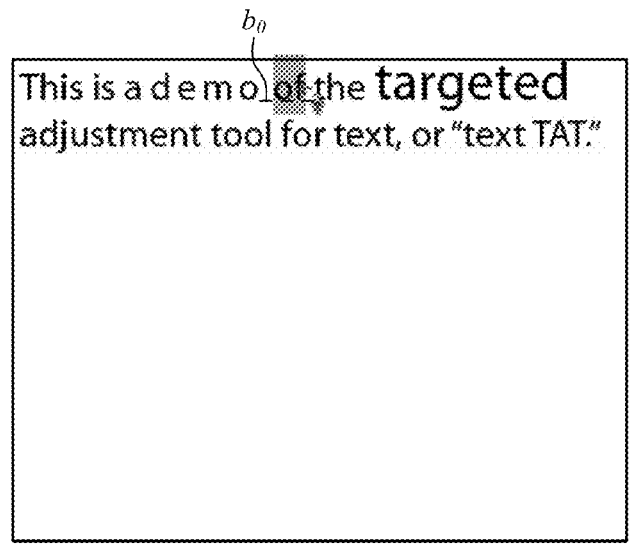
FIG. 5A depicts an illustration of selected text before a baseline shift, according to some embodiments of the text adjustment tool.
Figure 5B:
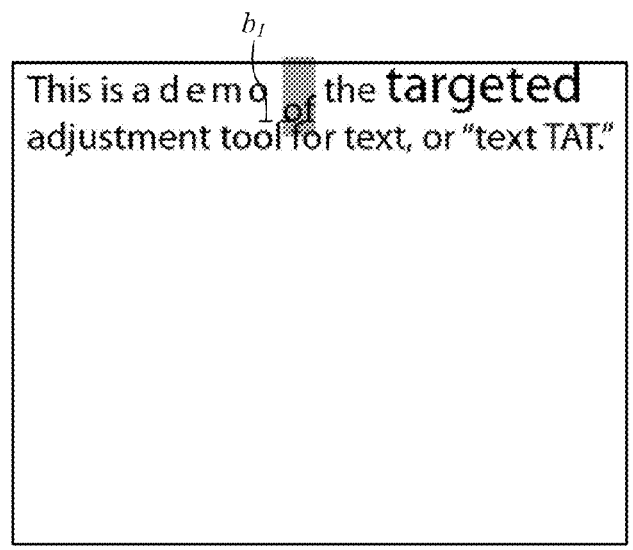
FIG. 5B depicts an illustration of selected text after a baseline shift downward, according to some embodiments of the text adjustment tool.

FIGS. 5A and 5B depict an example of the text adjustment tool applied to selected text to modify the baseline values of the selected text. A baseline refers to the line upon which text characters lie, and a baseline shift moves text characters up or down in relation to the baseline. When the baseline is increased for selected text, the selected text is moved above the baseline. When the baseline is decreased for selected text, the selected text is moved below the baseline. A baseline shift is another type of typographic attribute with which novice users may be unfamiliar. By providing immediate and intuitive adjustments, the text adjustment tool allows a user to avoid searching for the appropriate typographic attribute to adjust, to avoid searching for the right menu option, and to avoid stumbling for the correct quantity of measurement units to achieve the desired change. Because a user sees the selected text moving as the user clicks and drags on the selected text, the user may stop when satisfied without ever knowing which typographic attribute was modified.

As depicted in FIG. 5A, selected text "of" has an initial baseline shift value of $b_0$, which in this case is 0 points, indicating that "of" sits on the original baseline. Once the user activates the typographic attribute adjustment mode, the upward or downward direction of the mouse movement may be interpreted by the text adjustment tool. To distinguish from increasing or decreasing font size, a user may provide additional input data, such as a modifier key. For example, given selected text and a mouse button click while the cursor is hovering over the selected text, a user may additionally depress a key such as the CTRL key or the ALT key. In this example, given a concurrent CTRL key press, instead of increasing font size if the cursor is moved upward, a baseline shift is performed. In other embodiments, different combinations of inputs may be mapped to the baseline shift function.

In FIG. 5B, after downward movement of the cursor is interpreted while the text adjustment tool mode is activated, the baseline for the selected text "of" is decreased, as indicated by the new baseline shift value $b_1$. At the point that the user stops cursor movement, the baseline may also stop shifting, thus providing a user instant feedback as to where the selected text is to be positioned.

If at the point that the selected text "of" reaches baseline $b_1$, the user decides to increase instead of decrease the baseline value, then without deactivating the initially activated typographic attribute adjustment mode, the user may begin moving the cursor upward and the baseline will correspondingly increase. Such a dynamic change in typographic attribute adjustment while maintaining the typographic attribute adjustment mode may apply similarly to each of the other typographic attribute adjustments.

Figure 5C:
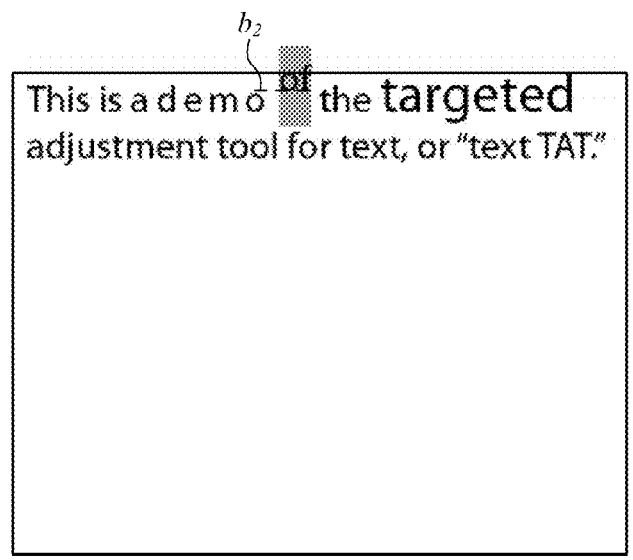
FIG. 5C depicts an illustration of selected text after a baseline shift upward, according to some embodiments of the text adjustment tool.

In FIG. 5C, after upward movement of the cursor is interpreted while the typographic attribute adjustment mode is activated, the baseline shift value for the selected text "of" is increased for the stored typographic values, as indicated by the new baseline shift value $b_2$. At the point that the user stops cursor movement the change in baseline shift value may also stop.

Example Typographic Attribute Modification: Leading

Figure 6A:
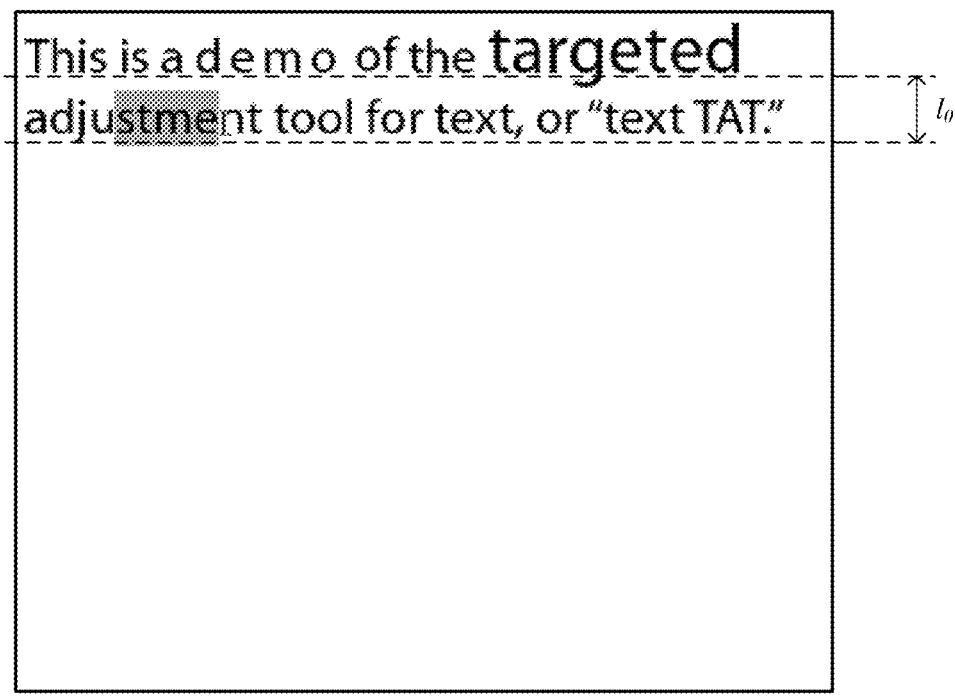
FIG. 6A depicts an illustration of selected text before a leading modification, according to some embodiments of the text adjustment tool.
Figure 6B:
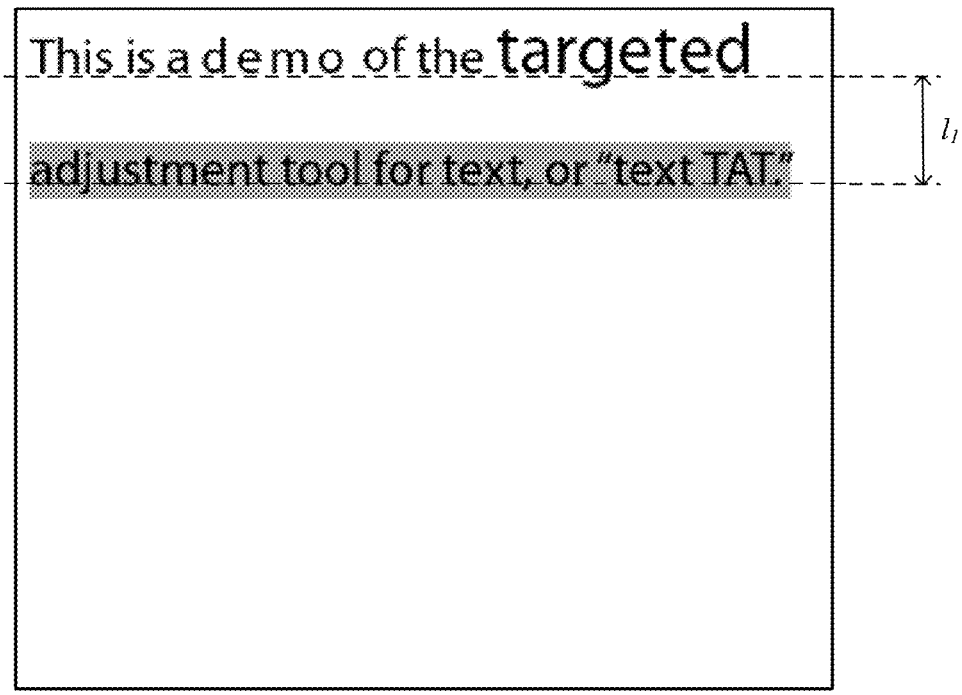
FIG. 6B depicts an illustration of selected text after a leading modification, according to some embodiments of the text adjustment tool.

FIGS. 6A and 6B depict an example of the text adjustment tool applied to selected text to modify the leading value of the line on which the selected text lies. Leading refers to the distance between the baselines of successive lines of text. Leading is another type of typographic attribute with which novice users may be unfamiliar. By providing immediate and context-aware adjustments, the text adjustment tool allows a user to avoid searching for the appropriate typographic attribute to adjust, for the right menu option, and to avoid repeated adjustments searching for the correct quantity of measurement units to achieve the desired change.

As depicted in FIG. 6A, selected text "stme" lies on a baseline that is a distance of $l_0$ from the baseline above. Once the user activates the typographic attribute adjustment mode, the upward or downward direction of the mouse movement may be interpreted by the text adjustment tool. To distinguish from increasing or decreasing font size or a baseline shift, a user may provide additional input data. For example, given selected text and a mouse button click while the cursor is hovering over the selected text, a user may additionally depress a key such as the CTRL key and/or the ALT key. In this example, given concurrent CTRL and ALT key presses, instead of increasing font size or baseline if the cursor is moved upward, an adjustment to leading is performed. In other embodiments, different combinations of inputs may be mapped to the leading function.

When the text adjustment tool is modifying leading, selection of partial text from a line, such as the selected "stme" text serves to temporarily expand text selection to the entire line of text. To apply an adjustment to a leading value, only a single character from a given line may be selected. This behavior overcomes a problem that may confuse users in the case when different characters within a line of text have different leading values. In such a case, using other typographic adjustment tools, if a user increases the leading value for a particular character while the leading value for another character on the line remains greater, the user will see no change to the baseline. Such behavior is counter-intuitive because if a user changes a leading value, the user expects for the baseline of the line to be adjusted. The text adjustment tool prevents this confusion when adjusting leading by applying the amount of movement of the selected text to each modified leading value of each character on the line, which results in the baseline always moving if the user is adjusting leading.

In FIG. 6B, after downward movement of the cursor is interpreted while the text adjustment tool mode is activated, the baseline distance between the baseline on which selected text resides and the baseline of the line of text above is increased, as indicated by the new distance between baselines $l_1$. At the point that the user stops cursor movement, the baseline distances between the lines may also stop increasing, thus providing a user instant feedback as to where the selected line of text is to be positioned.

In the case that a leading is adjusted when there exist lines of text both above and below the line on which text is selected, any lines below the selected line may move by the same amount, thereby maintaining the same baseline-to-baseline distances originally present. In this way, only the baseline distance between the selected line and the line above is affected. Further, if multiple lines, or portions thereof, are selected, the text adjustment tool may temporarily expand selection to include all characters across all lines affected, and the leading values are adjusted simultaneously. In this case, the baseline-to-baseline distances of all selected lines are all adjusted by the same amount. If the selected lines were initially evenly spaced, after an adjustment to the leading values, the selected lines may remain evenly spaced. If the selected lines had a variety of leading values, after an adjustment to the leading values, the selected lines may maintain relative spacing.

In some embodiments, to provide the user visual information of the fact that the entire line of text is affected, when the leading values begin to change, the entire line of text may be automatically highlighted. When the typographic adjustment is complete, the highlighting snaps back to only the original highlighted text.

Example Typographic Attribute Modification: Kerning

Figure 7A:
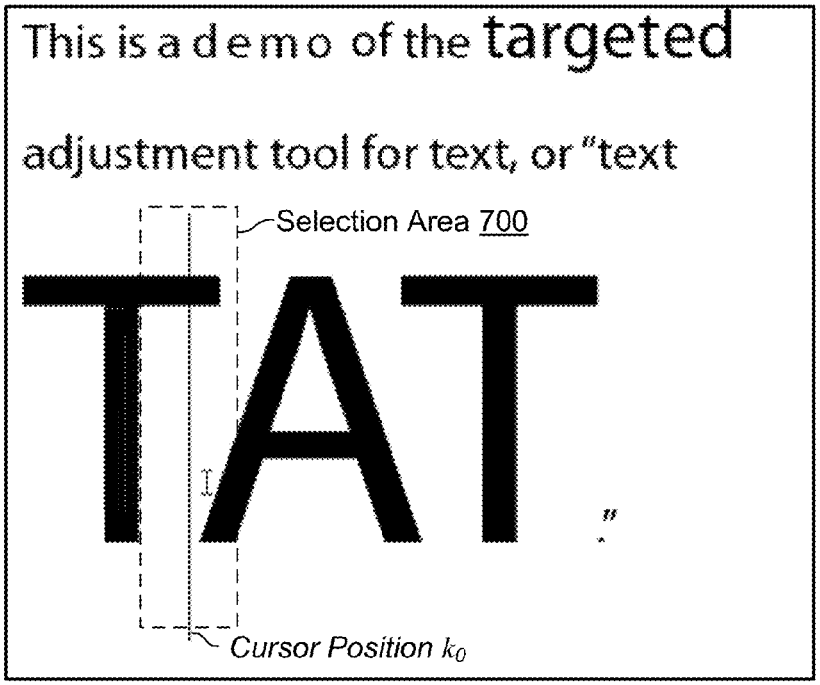
FIG. 7A depicts an illustration of a text insertion point before a kerning modification, according to some embodiments of the text adjustment tool.
Figure 7B:
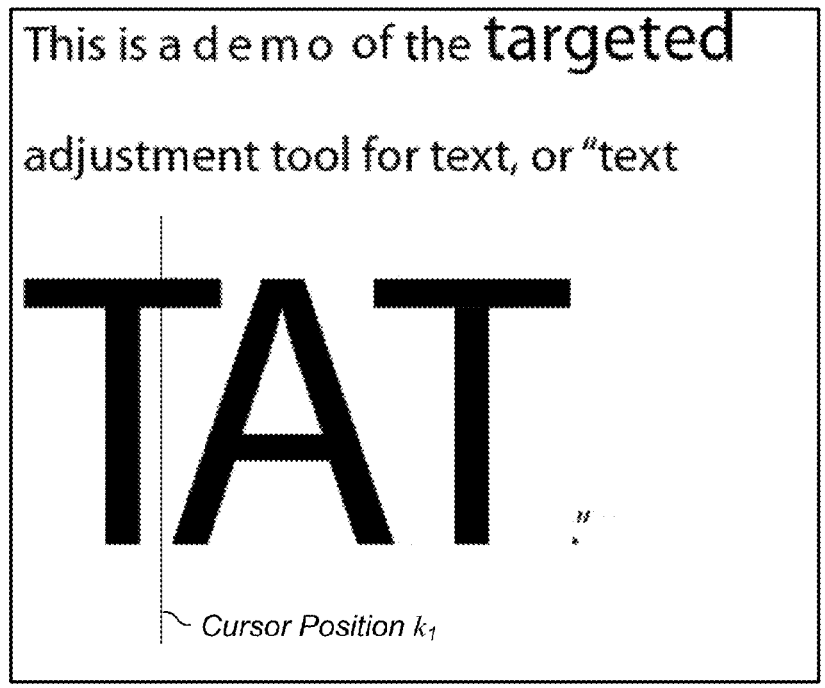
FIG. 7B depicts an illustration of a text insertion point after a kerning modification, according to some embodiments of the text adjustment tool.

FIGS. 7A and 7B depict an example of the text adjustment tool modifying a kerning value between two text characters. Kerning is another kind of typographic attribute with which many users are unfamiliar. Kerning, as opposed to tracking, only applies to the distance between pairs of text characters. When tracking is increased, the tracking value is applied to all selected characters, with kerning, only one distance between pairs of characters is involved.

In FIG. 7A, a region between the text characters "T" and "A" is depicted by selection area 700. If a user were to hover the cursor over selection area 700 and then depress and hold a mouse button, the typographic attribute adjustment mode may be activated. With the mouse button depressed, a user may move the cursor left or right and the distance between "T" and "A" may be correspondingly decreased or increased.

In FIG. 7A, cursor position $k_0$ corresponds to an initial cursor position for the text insertion point at the instant that the typographic attribute adjustment mode is activated. In FIG. 7B, cursor position $k_1$ corresponds to a cursor position after a user has moved the cursor leftward, thereby decreasing the kerning value between the "T" and "A." The kerning value may be similarly increased if the user had instead moved the cursor rightward while the typographic attribute adjustment mode is activated.

In the above example, only the kerning value between the single instance of "T" and "A" is adjusted. In other embodiments, kerning values for multiple sets of same letter pairs may be adjusted. For example, if all the text of a document is selected, and the mouse is hovered over a selection area between a single pair of characters, the user may activate the typographic attribute adjustment mode as above with a mouse button press in the selection area and begin dragging the cursor leftward or rightward. In this case, each pair of similar letters, for example "TA", within the entire selected text will have a kerning value increased or decreased according to the same typographic attribute adjustment amount. Because kerning is specific to letter pairs and shapes, this example would be case-sensitive. This allows a user to change kerning values between every letter pair within a selection at once.

In some embodiments, when a cursor is above a selection area, the cursor icon may be changed to indicate the availability of the text adjustment tool. Such a cursor icon change may be especially useful with kerning because kerning may be performed without text being selected.

Example Typographic Modification: Simultaneous Updates in an Adjacent Panel

Figure 8B:
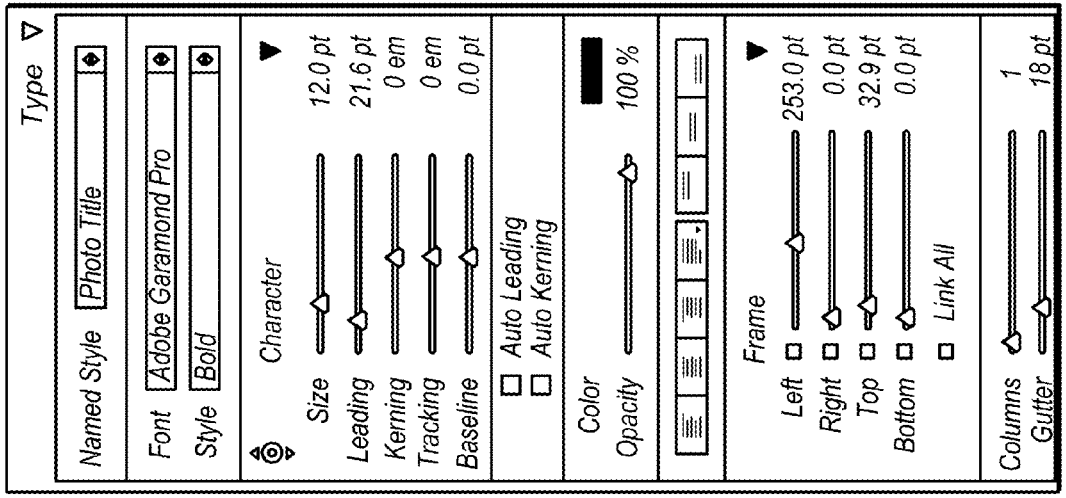
FIG. 8B depicts an illustration of typographic attribute adjustment panel corresponding to the typographic attribute values of FIG. 8A, according to some embodiments of the text adjustment tool user environment.
Figure 8A:
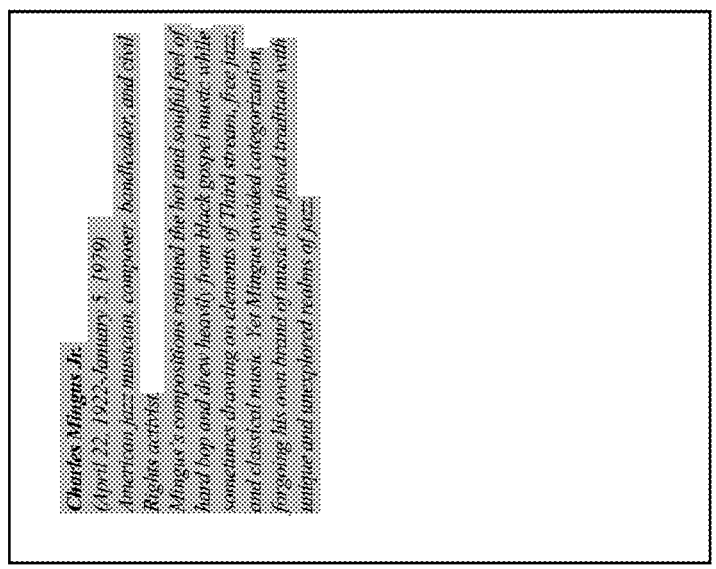
FIG. 8A depicts an illustration of selected text before a font size increase, according to some embodiments of the text adjustment tool.

FIGS. 8A and 8B depict an example where the text adjustment tool is applied to selected text while a typographic attribute adjustment panel is displayed in a window adjacent to and independent from the selected text. In this example, an entire paragraph is selected with the intention of resizing the paragraph to fill the space displayed. If after selecting the paragraph, a user were to enter a new font size value in the typographic attribute adjustment panel, it is highly unlikely that the user will select a font value that produces a resized paragraph that perfectly fits the displayed space.

If instead of using the typographic attribute adjustment panel, a user activates the text adjustment tool, the user may simply select the paragraph as in FIG. 8A and then click within the selected area and begin moving the cursor upward. The font size of the entire selected paragraph may be increased gradually as the user moves the cursor upward, and at the point that the user sees the display area filled with the resized paragraph, the user may stop moving the cursor, as in FIG. 8C.

Figure 8D:
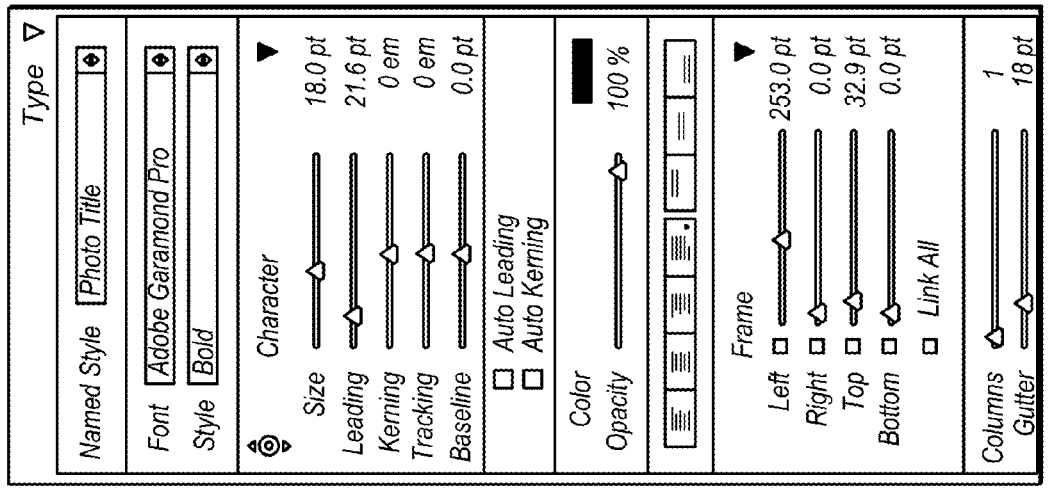
FIG. 8D depicts an illustration of typographic attribute adjustment panel corresponding to the typographic attribute values of FIG. 8C, according to some embodiments of the text adjustment tool user environment.
Figure 8C:
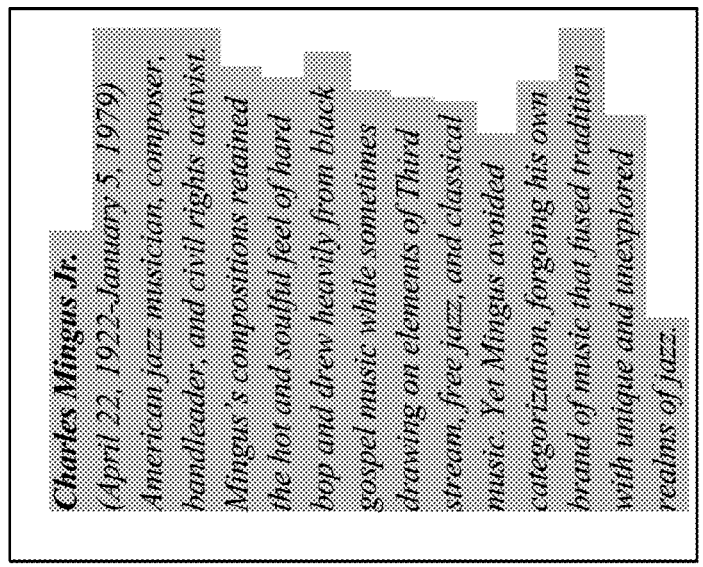
FIG. 8C depicts an illustration of selected text after a font size increase, according to some embodiments of the text adjustment tool.

FIG. 8B depicts an adjustment slider for a font size set to 12 points, which corresponds to an initial font size for the selected text in FIG. 8A. After a user has completed the font size increase, as depicted in FIG. 8C, the new font size is 18 points, which is depicted in the typographic attribute adjustment panel in FIG. 8D. Further, as a user is adjusting through the text adjustment tool, the typographic attribute adjustment panel may receive real-time updates and a user may see the typographic attribute values change along with the slider knob move with each modification by the text adjustment tool.

By using the text adjustment tool, without making a series of guesses as to which font size would result in the correctly sized paragraph, a user is provided with a method for intuitively and directly modifying typographic attributes of selected text. Further, these typographic attribute adjustment modifications may be performed without a user ever opening a typographic attribute adjustment panel window.

Example Typographic Modification: Cursor Velocity

In each of the above examples related to typographic attribute adjustments to font size, tracking, baseline shifts, leading, and kerning, cursor movements are interpreted with respect to an amount of cursor movement as measured from the beginning of the activation of the typographic attribute adjustment mode until the deactivation of the typographic attribute adjustment mode. For example, in the case of a font size increase, given a certain amount of cursor movement while the typographic attribute adjustment mode is active, the font size may be increased evenly and gradually by an amount corresponding to the amount of cursor movement.

However, in some embodiments, given selected text characters and an activated typographic attribute adjustment mode, the speed with which a user moves the cursor may be used as a multiplying factor for the rate of change for which a typographic attribute modification is applied. For example, if the cursor is moved upward quickly during a font resize, the font size is increased in large increments. Similarly, if the cursor is moved upward slowly during a font resize, the font size is increased in small increments. By correlating the speed of cursor movements to a rate of change of a typographic attribute adjustment, the text adjustment tool provides intuitive feedback to a user. In other words, when a user moves a cursor slowly, a user typically expects effects of the cursor movement to happen gradually, and when a user moves a cursor quickly, a user may typically expect effects of the cursor movement to happen dramatically.

Whether or not cursor velocity is used as a multiplying factor may depend on selecting or deselecting a user configuration setting.

Example Computer System

Figure 9:
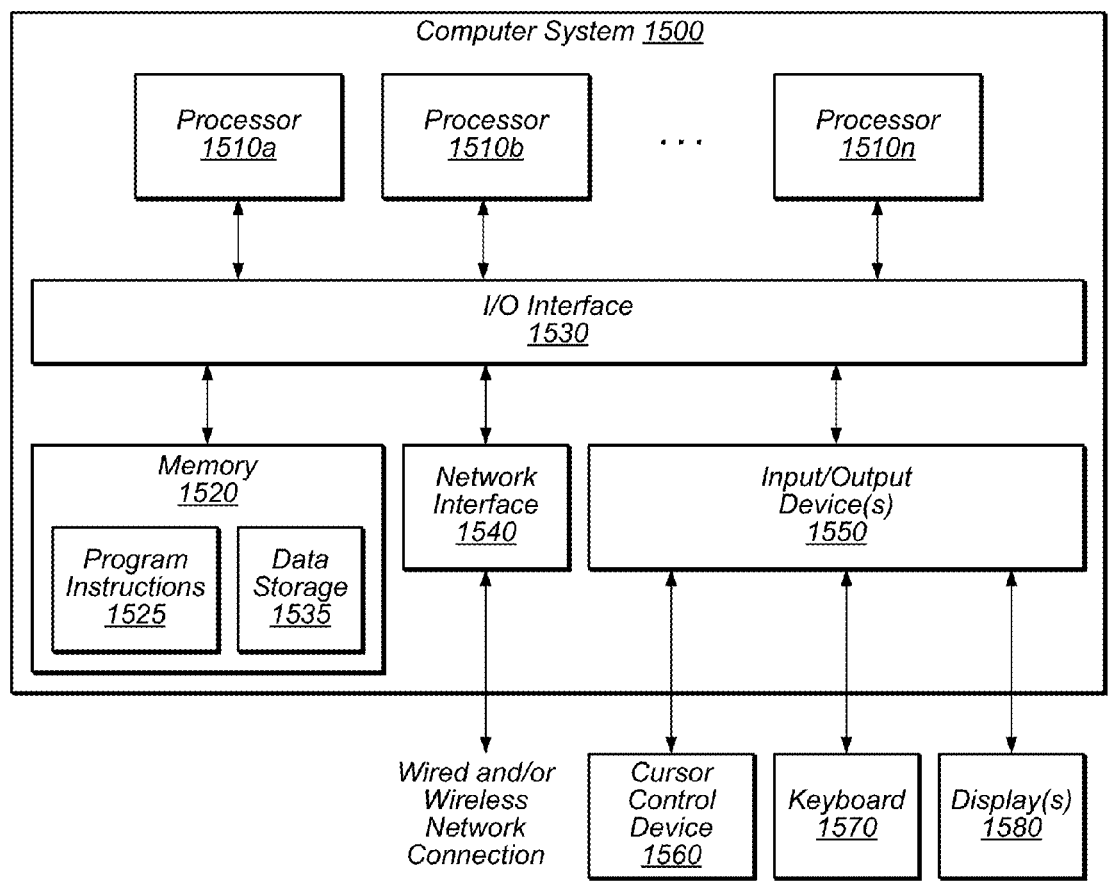
FIG. 9 depicts a computer system suitable for an implementation of the text adjustment tool, according to some embodiments.

FIG. 9 illustrates a computer system 1500 that may execute embodiments of text adjustment tool. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, the computer system includes one or more processors coupled to a system memory via an input/output (I/O) interface. The computer system further includes a network interface coupled to an I/O interface, and one or more input/output devices, such as a cursor control device, a keyboard, and display(s). In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible by a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the text adjustment tool are shown stored within system memory as program instructions and data storage, respectively. In other embodiments, program instructions and/or data may be received, sent or stored upon different types of computer-accessible media or on similar media separate from system memory or the computer system.

Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for use by another component. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data by one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement embodiments of the text adjustment tool as described herein. In one embodiment, the program instructions may include software elements of embodiments of the modules discussed earlier in one of the embodiments of the text adjustment tool. The data storage within the computer system may include data that may be used in other embodiments. In these other embodiments, other or different software elements and data may be included.

Those skilled in the art will appreciate that the computer system is merely illustrative and is not intended to limit the scope of the text adjustment tool as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or by a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    activating a typographic attribute adjustment mode in response to detecting an input when at least one of a cursor or a touch-input component is over a region of selected text or over a text insertion point on a display, wherein text characters are rendered on the display based on typographic attributes;
    receiving an indication of movement of the at least one of the cursor or the touch-input component in a particular direction across the display while the typographic attribute adjustment mode is active,
        wherein the movement begins at a point within the region of selected text or begins at the text insertion point, and ends at or intersects a different point, the different point occurring at a different location on the display than the point at which the movement begins;
    in response to receiving the indication of the movement across the display while the typographic attribute adjustment mode is active and by at least one computing device:
        calculating a distance between the point at which the movement begins and the different point;
        calculating a velocity of the movement;
        modifying a typographical attribute of the typographic attributes for one or more of the text characters dependent on a combination of the calculated distance and the calculated velocity, with different calculated distances and different calculated velocities in the same particular direction causing different modifications of the typographical attribute;
    re-rendering the one or more text characters according to the modified typographical attribute; and
    modifying a stored version of the one or more text characters based on the modified typographical attribute.

2. The computer-implemented method of claim 1, wherein said modifying further depends on the particular direction of the movement of the at least one of the cursor or the touch-input component across the display, wherein movement in a first direction causes a first type of modification to the typographical attribute, and wherein movement in second direction causes a second, different type of modification to the typographical attribute.

3. The computer-implemented method of claim 2, wherein said modifying further depends on a combination of the calculated distance, the calculated velocity, and the particular direction of the movement across the display.

4. The computer-implemented method of claim 1, further comprising:
    displaying values for the typographic adjustment attributes within an adjustment panel window,
        wherein the adjustment panel window accepts input for changing the typographic adjustment attributes, and
        wherein the adjustment panel window is displayed concurrently with and distinctly from the text characters; and
    updating said displayed values for the typographic adjustment values within the adjustment panel window in response to said modifying the one or more of the typographic attributes for the one or more of the text characters.

5. The computer-implemented method of claim 1, wherein the touch-input component comprises a single finger, and where the distance is based on a detected movement of the single finger from the point at which the movement begins to the different point.

6. The computer-implemented method of claim 1, wherein said modifying a typographical attribute comprises modifying a font size of the one or more text characters, and wherein modifying a stored version of the one or more text characters comprises modifying a font size of the stored version of the one or more text characters.

7. The computer-implemented method of claim 1, wherein the typographical attribute comprises one or more of a tracking value, a baseline shift value, a leading value, or a kerning value.

8. The computer-implemented method of claim 1, wherein:
the one or more text characters comprises the region of selected text on the display;
the display includes at least one non-selected text character displayed concurrently with the region of selected text; and
wherein said modifying the typographical attribute for the one or more text characters comprises modifying the typographical attribute for the region of selected text without modifying the typographical attribute for the at least one non-selected text character.

9. A computer-implemented method, comprising:
activating a typographic attribute adjustment mode in response to detecting an input when at least one of a cursor or a touch-input component is over a region of selected text,
wherein text characters of the selected text are rendered on the display based on typographic attributes;
receiving an indication of movement of the at least one of the cursor or the touch-input component across the display while the typographic attribute adjustment mode is active,
wherein the movement begins at a point on the display within the region of selected text and ends at a different point on the display, the different point on the display occurring at a different location on the display than the point on the display;
in response to receiving the indication of the movement across the display while the typographic attribute adjustment mode is active, modifying by at least one computing device a font size of the selected text based on a distance between the point on the display and the different point on the display and without modifying the font size for non-selected text presented on the display,
wherein said modifying preserves relative size and spacing between the text characters of the selected text;
re-rendering the selected text according to the modified font size; and
modifying a stored version of the selected text based on the modified font size.

10. The computer-implemented method of claim 9, further comprising calculating a velocity of the movement across the display, wherein said modifying the selected text is based on a combination of the distance of the movement and the velocity of the movement.

11. A system, comprising:
at least one processor; and
a memory comprising program instructions, wherein the program instructions are executable by the at least one processor to cause the system to perform operations including:
activating a typographic attribute adjustment mode in response to detecting an input when at least one of a cursor or a touch-input component is over a region of selected text or over a text insertion point on a display,
wherein text characters are rendered on the display based on typographic attributes;
receiving an indication of movement of the at least one of the cursor or the touch-input component in a particular direction across the display while the typographic attribute adjustment mode is active,
wherein the movement begins at a point within the region of selected text or begins at the text insertion point, and ends at or intersects a different point, the different point occurring at a different location on the display than the point at which the movement begins;
in response to receiving the indication of the movement across the display while the typographic attribute adjustment mode is active:
calculating a distance between the point at which the movement begins and the different point;
calculating a velocity of the movement;
modifying a typographical attribute for one or more of the text characters dependent on the calculated distance in combination with the calculated velocity, with different calculated distances and different calculated velocities in the same particular direction causing different modifications of the typographical attribute; and
re-rendering the one or more text characters according to the modified typographical attribute.

12. The system of claim 11, wherein the operations further include:
changing a visual shape of the cursor on the display responsive to activation of the typographic attribute adjustment mode and to indicate said activating the typographic attribute adjustment mode.

13. The system of claim 11, wherein the touch-input component comprises a single finger, and where the distance is based on a detected movement of the single finger from the point at which the movement begins to the different point.

14. The system of claim 11, wherein the typographical attribute comprises one or more of a tracking value, a baseline shift value, a leading value, or a kerning value.

15. The system of claim 11, wherein the one or more of the text characters are within the region of selected text, and wherein said modifying comprises modifying the typographical attribute for the one or more text characters without modifying one or more other non-selected text characters on the display.

16. A computing device having stored thereon program instructions which are executable to cause the computing device to perform operations comprising:
activating a typographic attribute adjustment mode in response to detecting an input when at least one of a cursor or a touch-input component is over a region of selected text on a display,
wherein text characters are rendered on the display based on stored typographic attributes;
receiving an indication of movement of the at least one of the cursor or the touch-input component in a particular direction across the display while the typographic attribute adjustment mode is active,
    wherein the movement begins at a point and ends at or intersects a different point, the different point occurring at a different location on the display than the point at which the movement begins;

in response to receiving the indication of the movement across the display while the typographic attribute adjustment mode is active:
    calculating a distance between the point at which the movement begins and the different point;
    modifying a typographical attribute for one or more of the text characters of the selected text dependent on the calculated distance and without modifying the typographical attribute for non-selected text on the display, with different calculated distances in the same particular direction causing different modifications of the typographical attribute;
    re-rendering the one or more text characters according to the modified typographical attribute; and
    modifying a stored version of the selected text based on the modified typographical attribute.

17. The computing device of claim 16, wherein the operations further comprise calculating a velocity of the movement across the display, and wherein said modifying further depends on the particular direction of the movement and the calculated velocity of the movement of the at least one of the cursor or the touch-input component across the display.

18. The computing device of claim 16, wherein the operations further comprise:
    changing a shape of the cursor on the display to indicate said activating the typographic attribute adjustment mode.

19. The computing device of claim 16, wherein the touch-input component comprises a single finger, and where the distance is based on a detected movement of the single finger from the point at which the movement begins to the different point.

20. The computing device of claim 16, wherein the operations further comprise calculating a velocity of the movement across the display, and wherein said modifying further comprises using the velocity as a multiplying factor for a rate at which the typographical attribute is modified.

\* \* \* \* \*